Oct. 31, 1950     H. J. STIEGER     2,527,774
DELIVERY VEHICLE
Filed Dec. 13, 1947     3 Sheets-Sheet 1
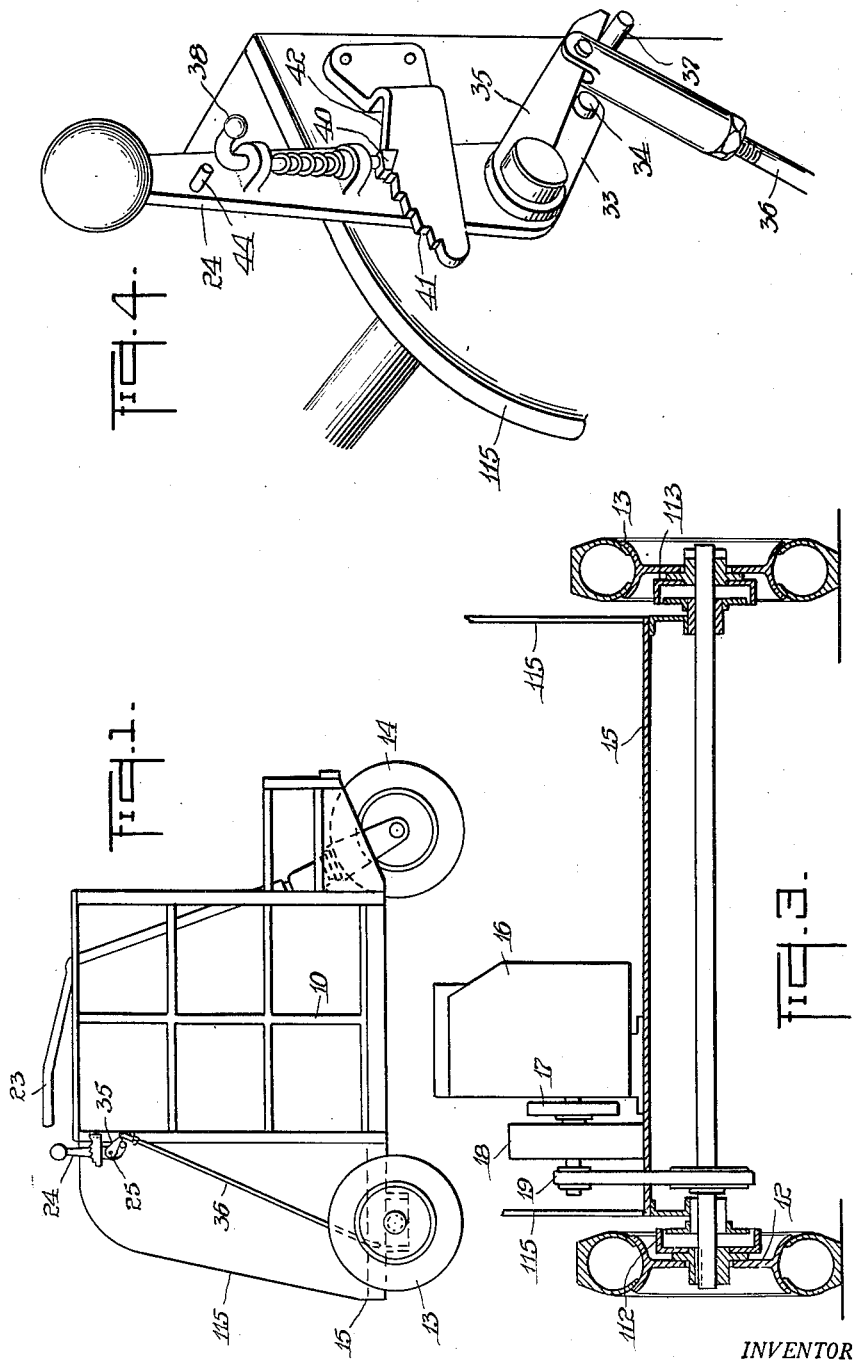
INVENTOR:
HELMUT JOHN STIEGER
BY
Richardson and David
ATTY'S

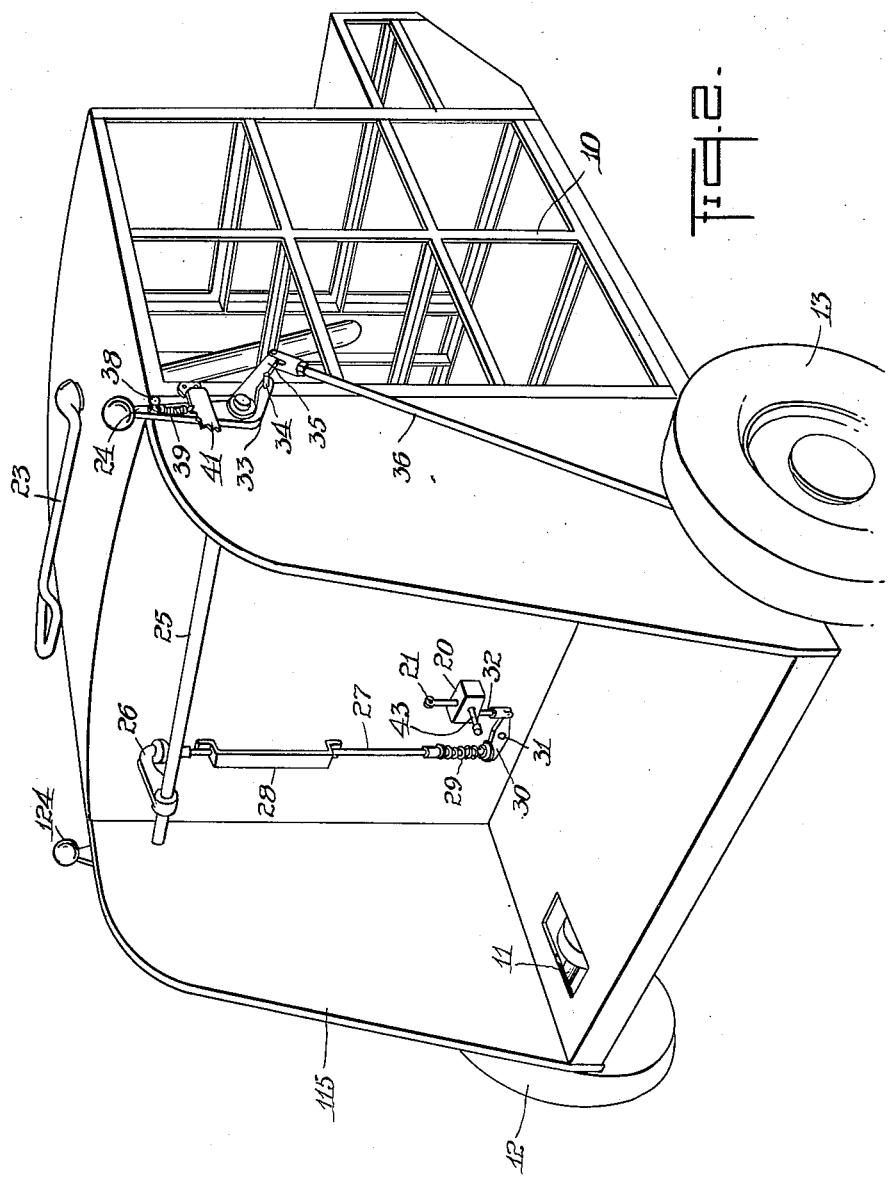

Oct. 31, 1950  H. J. STIEGER  2,527,774
DELIVERY VEHICLE
Filed Dec. 13, 1947  3 Sheets-Sheet 3
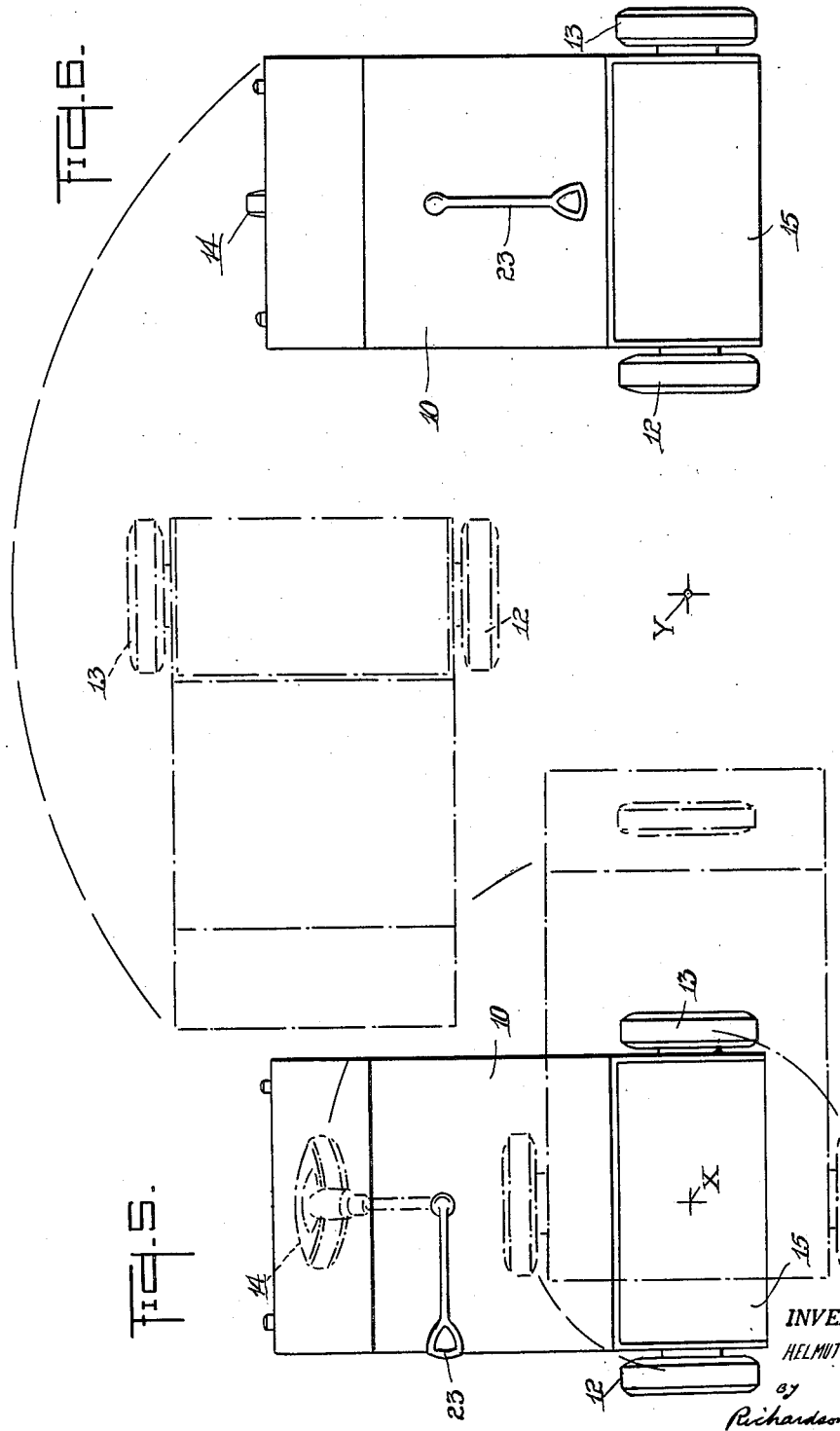
INVENTOR:
HELMUT JOHN STIEGER
BY
Richardson and David
ATTY'S Patented Oct. 31, 1950

2,527,774

UNITED STATES PATENT OFFICE 2,527,774

DELIVERY VEHICLE

Helmut John Stieger, Brough, England

Application December 13, 1947, Serial No. 791,602
In Great Britain July 3, 1945

Section 1, Public Law 690, August 8, 1946
Patent expires July 3, 1965

5 Claims. (Cl. 180—27)

This invention relates to motor driven delivery vehicles for goods, such for example as milk, groceries or the like, of the kind having at one end a steering wheel and at the other a pair of wheels.

The principal object of the present invention is to provide a delivery vehicle which will start to move forwardly on acceleration of the engine under control of a single member which will optionally also apply a brake.

Another object of the invention is to provide such a vehicle with increased maneuverability whereby it may easily be turned in a small circle as when driving away from the near-side curb.

The foregoing and other objects of the invention will become apparent from the following specification which describes, with the aid of the attached drawings, a non-limitative example of one form of delivery truck.

In the drawings:

Figure 1 shows a side elevation of the truck,

Figure 2 shows on an enlarged scale a rear perspective view of the truck, with the engine, clutch and gear box omitted in order to show the governor and associated control mechanism, Figure 3 shows a vertical section through the rear axle as seen from behind, Figure 4 shows on an enlarged scale a detail view of the control lever, Figure 5 is a diagrammatic plan view of the vehicle chassis, showing the vehicle turning to the off side, and Figure 6 is a similar diagram, showing the vehicle turning to the near side.

The truck comprises a main body 10, to accommodate milk bottle crates or other goods, supported on a rear axle 11, carrying a driven rear wheel 12 and a free rear wheel 13, and a steerable front wheel 14. The rear wheels 12, 13 are provided with brake drums 112, 113 respectively. At the rear of the main body is a driver's platform 15, joined to the body by side members 115. On the platform 15 is supported an internal combustion engine 16 (Figure 3) which drives the axle 11 through a centrifugal clutch 17, gear box 18 and belt drive 19. The engine 16 is fitted with a governor 20, driven by the engine through shaft 43 (Figure 2) which governor automatically adjusts the engine throttle (not shown) through the agency of a link 21 so as to keep the engine running at given speeds.

The platform 15 is supported by a stiffening frame 22, and the driver stands on the platform to the right of the engine. He is able to steer the front wheel 14 by means of a tiller 23 and to control the engine by means of a control lever 24 easily accessible to his right hand. The lever 24 is supported on a torque tube 25 carrying an arm 26 which, in the neutral position of the lever 24 shown in the drawings, abuts against the upper end of a rod 27 mounted to slide in a guide bracket 28. At its lower end the rod 27 is connected by a spring 29 to the left hand end of a cross bar 30 pivoted centrally at 31 and connected at its right hand end to a governor adjusting rod 32. Movement of the rod 32 varies the setting of the governor spring and consequently the datum of the governor and the speed at which, by adjustment of the throttle, the governor will maintain the engine running.

In the neutral position of the lever 24, the engine 16 is idling and the clutch 17 disengaged. If the lever 24 is moved in clockwise direction as seen in Figures 1, 2 and 4 from this position, the rod 27 is depressed thereby, through the agency of spring 29, cross bar 30 and rod 32, adjusting the governor 20 to increase the engine speed. This causes engagement of the centrifugal clutch 17 to transmit the drive to the rear axle 11 and driven rear wheel 12.

When the lever 24 is moved anti-clockwise from the neutral position a brake is applied. The braking mechanism for the free rear wheel 13 is shown in Figures 2 and 4. An identical mechanism not shown, because outside the left hand side member 115, applies the brake to the other rear wheel 12. A second hand lever 124 is fitted, in order to comply with road transport regulations, to the left hand end of torque tube 25 (Figure 2) so that there are two independent brake mechanisms in case of failure. The levers 24, 124 operate directly on the associated wheels but they are rigidly coupled together by the torque tube 25.

At each end of the torque tube 25 is fixed a crank 33 carrying a pin 34. Free on each end of the tube 25 is an arm 35 coupled to a brake rod 36 and normally held against a pin 37 projecting from the vehicle body by a spring in the brake drum, which holds the brake shoes in the off position.

Clockwise movement of lever 24 to accelerate the engine is ineffective on the brakes as the pins 34 move away from the arms 35. Anti-clockwise movement of lever 24 from the neutral position, however, causes pins 34 to rock arms 35 anti-clockwise and lift the brake rods 36 to apply the brakes. On such anti-clockwise movement of lever 24, the arm 26 moves idly away from the upper end of rod 27 and the engine remains idling.

Fitted to the lever 24 is a latching lever 38 (Figure 4) loaded by a spring 39. The latching lever 38 has at its lower end a tooth 40 which can engage teeth of a quadrant 41 to lock the lever 24 in braking position. When the lever 24 is moved clockwise to accelerate the engine, the tooth 40 moves over a smooth portion 42 of the quadrant. The lever 38 can be rendered inoperative, at will, by lifting it against its spring 39 and hooking its upper end over a pin 44.

The advantage of driving the near side rear wheel only is that it facilitates turning in a small circle when driving away from a parked position near the curb and dispenses with the necessity for a reverse gear. This is shown diagrammatically in Figure 5, the vehicle pivoting about a point X midway between the two rear wheels and the free wheel 13 rotating in a reverse direction. When turning to the near side, the vehicle pivots about a point Y (Figure 6), the free wheel 13 in this case rotating in a forward direction. In England and certain British Dominions the drive is taken to the left hand wheel 12 (as illustrated) when the driver stands on the right hand side of the platform 15 but for the United States of America, Canada, the continent of Europe and other places where the right hand rule of the road applies, the drive is taken to the right hand driving wheel 13, the levers 24 and 124 are reversed and the engine 16 placed on the right hand side of the platform so that the driver stands on the left hand side.

The vehicle may be made light in weight, e. g. 3½–4 cwt. tare weight and arranged to have a maximum speed of 10–12 M. P. H., so that it is eminently suitable for house-to-house deliveries, where frequent starting and stopping are necessary.

Various changes may be made in the disposition and arrangements of the parts of the vehicle without departing from the scope of the invention as defined in the following claims.

I claim:

1. In a three wheel motor driven delivery vehicle, an engine, a centrifugal clutch driven by said engine, a driving connection from said clutch to a driving road wheel, a control lever movable in either direction away from a neutral position, spring loaded means accelerating said engine, means movable with said lever and effective on displacement thereof in one direction to engage said spring loaded means, wheel brakes, operative means for actuating said wheel brakes, means movable with said lever and effective on displacement thereof in the opposite direction to engage said operating means to apply said brakes, spring loaded means on said lever effective to prevent return movement thereof after movement in such opposite direction, and manually operable means to disengage said last mentioned spring loaded means to permit return movement of said lever to neutral position.

2. In a three wheeled motor driven delivery vehicle, a steerable wheel at the front, a pair of road wheels at the rear, brakes effective on said pair of road wheels, an engine at the rear of said vehicle, a centrifugal clutch driven by said engine, a driving connection from said centrifugal clutch to the road wheel on the near side of the vehicle, a cross shaft carried by said vehicle, a control lever fast on one of said cross shaft for movement in either direction away from neutral position, means for accelerating said engine, lever means on said shaft operable on movement of said control lever in one direction to engage said means for accelerating the engine, lever means free on said cross shaft and connected to said brakes, means operable on movement of said control lever in the opposite direction to rock said lever free on said cross shaft to apply said brakes, a toothed member, a spring loaded element on said control lever engageable with said toothed member on displacement of said control lever in such opposite direction, and manually operable means to disengage said spring loaded element.

3. In a three wheeled motor driven delivery vehicle, a steerable road wheel at the front, a pair of road wheels at the rear, a platform at the rear, an engine on said platform, a centrifugal clutch driven by said engine, a driving connection from said clutch to that of said pair of road wheels on the near side of the vehicle, a tiller steering arm from said steerable front wheel to a point accessible to a driver on said platform, a control member on one side of the vehicle, means operative on movement of said control member in one direction from a neutral position to cause acceleration of said engine with consequent engagement of said centrifugal clutch, a brake, and means operative on movement of said control member in the opposite direction from neutral position to apply said brake.

4. In a three wheeled motor driven delivery vehicle, a steerable wheel at the front, a pair of road wheels at the rear, brake means for said pair of road wheels, an engine, a centrifugal clutch driven by said engine, a driving connection from said centrifugal clutch to the road wheel on the near side of the vehicle, a transverse torque tube, a control member on said torque tube, lever means on said torque tube operative on movement of said control member in one direction from a neutral position to cause acceleration of said engine with consequent engagement of said centrifugal clutch, and further lever means on said torque tube operative on movement of said control member in the opposite direction from neutral position to apply said brake means.

5. In a three wheeled motor driven delivery vehicle, a steerable road wheel at the front, a pair of road wheels at the rear, brake means for said pair of road wheels, a platform at the rear, an internal combustion engine on said platform, a governor for controlling the speed of said engine, a centrifugal clutch driven by said engine, a driving connection from said clutch to that of said pair of road wheels on the near side of the vehicle, a tiller steering arm from said steerable front wheel to a point accessible to a driver on said platform, a control member situated on one side of the vehicle on a transverse torque tube, means on said torque tube operative through a lost motion connection on movement of said control member in one direction from a neutral position to change the datum of said governor and cause acceleration of said engine with consequent engagement of said centrifugal clutch, levers loose on said torque tube, rods connecting said levers to said brake means, lever means fast on said tube, and means connecting respectively said lever means through a lost motion connection to apply said brake means operative on movement of said control member in the opposite direction from neutral position.

HELMUT JOHN STIEGER.

REFERENCES CITED

The following references are of record in the file of this patent:

UNITED STATES PATENTS

| Number | Name | Date |
|---|---|---|
| 898,481 | Johnson | Sept. 15, 1908 |
| 1,748,041 | Backhus | Feb. 18, 1930 |
| 2,033,433 | Leupold | Mar. 10, 1936 |
| 2,051,289 | Custer | Aug. 18, 1936 |
| 2,063,793 | Cook | Dec. 8, 1936 |
| 2,207,447 | Viles et al. | July 7, 1940 |
| 2,331,976 | Hare | Oct. 19, 1943 |
| 2,445,058 | Fields | July 13, 1948 |

FOREIGN PATENTS

| Number | Country | Date |
|---|---|---|
| 501,007 | Great Britain | Feb. 13, 1939 |